Feb. 22, 1966 D. A. GARRETT 3,236,325
POWERED TRANSMISSION ARRANGEMENT FOR
ARTICULATING-FRAME LOGGING TRACTOR
Filed Nov. 8, 1963 3 Sheets-Sheet 1
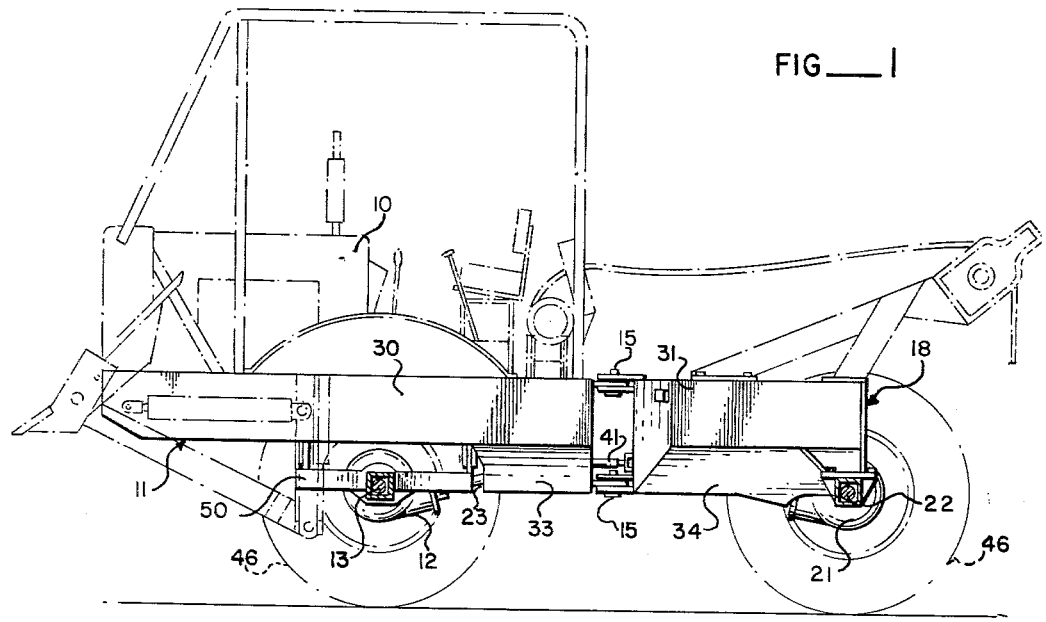
FIG__1
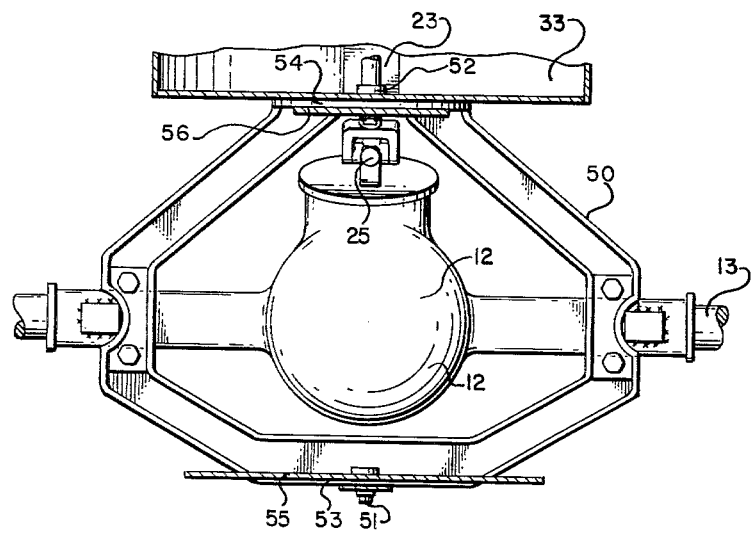
FIG__6
DWIGHT A. GARRETT
INVENTOR.
BY *Seed & Berry*
ATTORNEYS

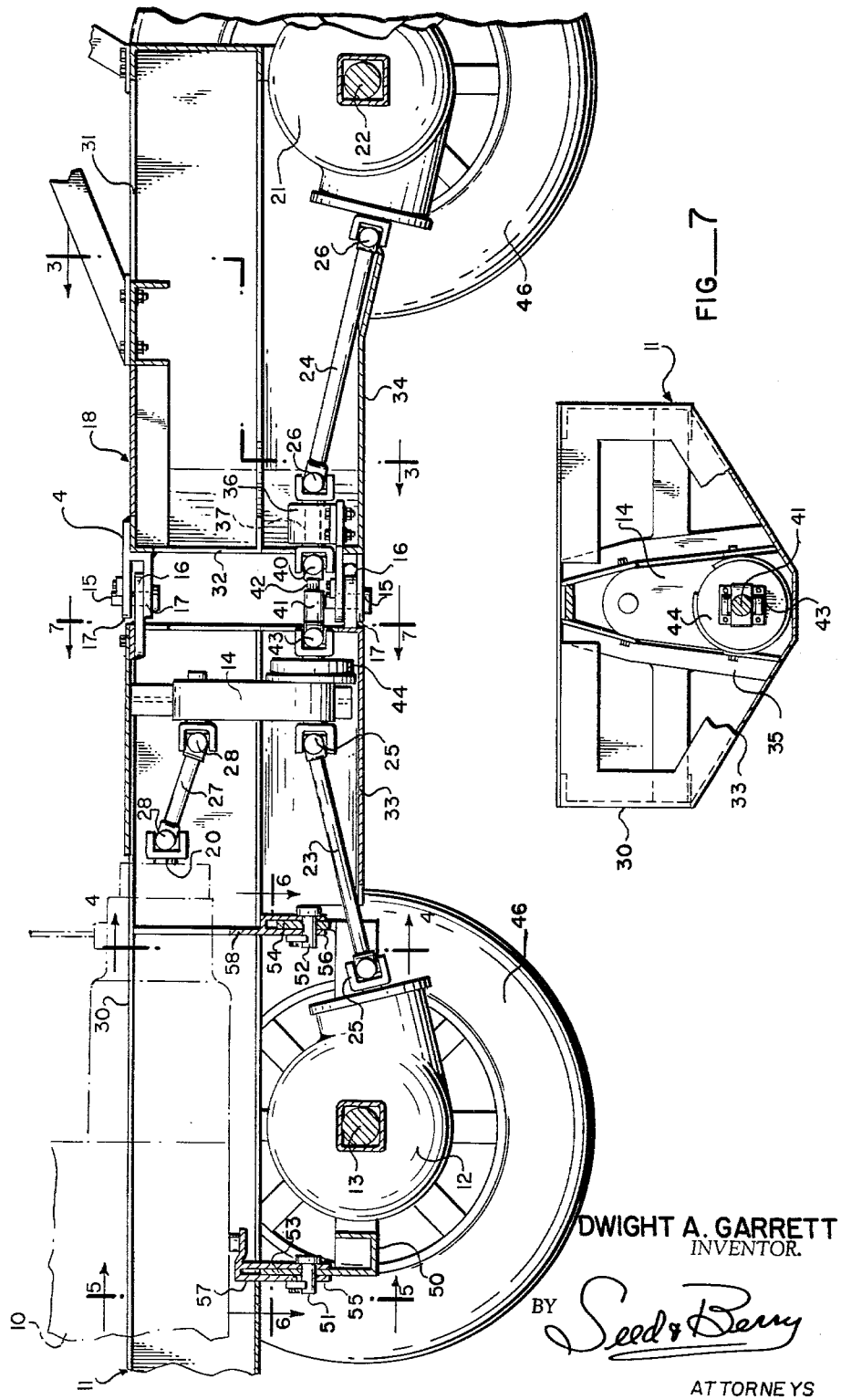

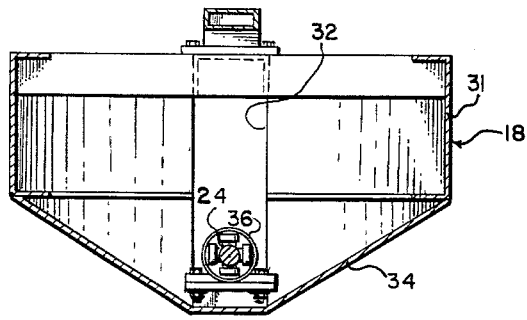
FIG__3
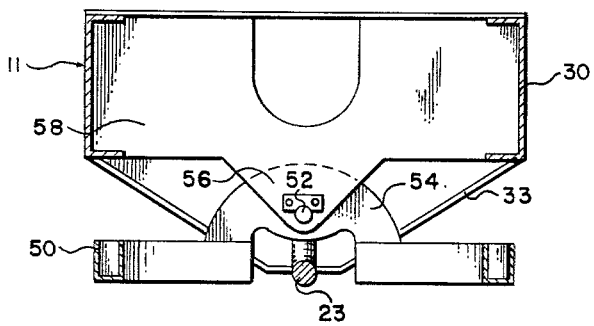
FIG__4
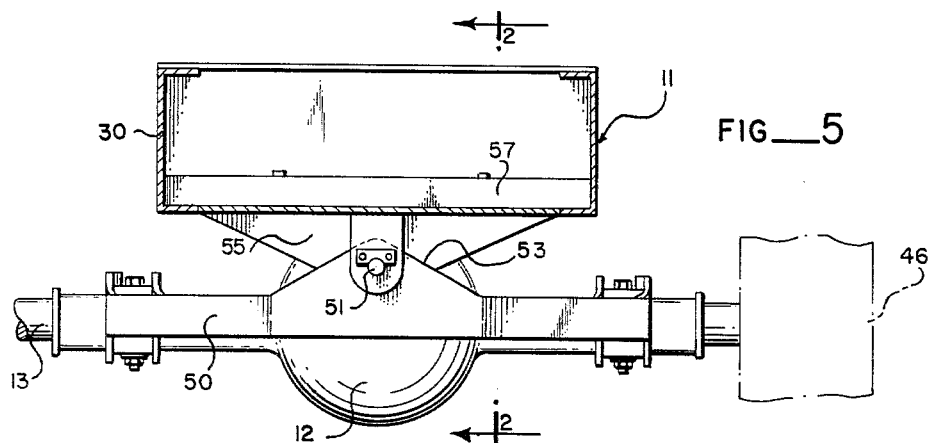
FIG__5
DWIGHT A. GARRETT
INVENTOR.
BY Seal & Berry
ATTORNEYS

United States Patent Office 3,236,325
Patented Feb. 22, 1966

3,236,325
POWERED TRANSMISSION ARRANGEMENT FOR ARTICULATING-FRAME LOGGING TRACTOR
Dwight A. Garrett, Enumclaw, Wash., assignor to Garrett Enumclaw Co., Enumclaw, Wash., a corporation of Washington
Filed Nov. 8, 1963, Ser. No. 322,564
7 Claims. (Cl. 180—51)

The present invention relates in general to articulating-frame logging tractors of the type disclosed in United States Patent 3,049,186, in which two 2-wheeled frame sections swivel one in relation to the other about a vertical axis occupying the longitudinal median line of both sections, and wherein the axle for each frame section is live so that all four wheels are driven. The swivel movement provides steering control for the tractor so that the vehicle has an unusually short turning radius and assured tractive power to each of the four wheels while turns are being negotiated. The present invention aims to provide an articulating-frame tractor of this type in which (1) the transfer of power from the engine to the live axles of the two frame sections is performed in a more advantageous manner than heretofore, and (2) the frames are so designed as to effectively protect drive shafts employed in such transfer and guard the tractor against liability of the same being hung-up in consequence of passing over stumps or other ground objects.

Peculiar problems exist in providing an efficient drive arrangement for tractors of the above-identified type. Since these tractors, in the performance of the logging functions for which they are primarily intended, must travel over extremely rugged terrain the front and rear wheel mountings must be capable of relative oscillation. The transfer of power from an engine supported by one frame section must be so trained as to efficiently carry the drive to both a rocking and a non-rocking axle, and in the performance thereof traverse the axis of articulation. The problems are further compounded by the requirement of locating as much of the weight of the transmission coupling arrangement as possible on the front frame section and front wheels, thus leaving the rear section to carry the work loads of the tractor. In providing such power transmission, the desired manner of training the power through the various torque shafts is perforce one which requires the least possible cocking between connecting sections of such shafts as one frame section swings relative to the other, and which confines such cocking to the shortest possible distance within a length of the vehicle containing the articulating axis.

The present invention, looking to the accomplishment of the foregoing objects and recognizing the problems to be overcome, is characterized by a simplification of the arrangement of rotating torque shafts at the point of articulation between the sections of the tractor frame, a more advantageous distribution of the weight attributed to the various elements of the coupling arrangement and gear transfer case, and such a placement of the vertical axes of universals at the ends of the main power shafts leading to and from the transfer case that the same are maintained parallel in the same vertical plane while turns are being negotiated, thus to prevent vibration. The invention further attains a reduction in the noise level occasioned by the necessity of higher r.p.m. requirements for the main power shaft when utilized with planetary axles, eliminates any need to run more than one power shaft past the axis of articulation, and avoids the need for shimming or adjusting the transfer case to fit different types of axles, hence allowing the use of a standard transfer case to accommodate all axles and making for quick assembly.

The means by which the foregoing objects and advantages are accomplished are set forth in the following specification and illustrated in the accompanying drawings, in which:

FIGURE 1 is a longitudinal vertical sectional view portraying the frame, axles, and drive lines for a tractor constructed to embody the preferred teachings of the present invention, the section line being immediately to the inside of the near wheels. Associated parts of the tractor are shown in phantom.

FIG. 2 is a fragmentary longitudinal vertical sectional view thereof drawn to an enlarged scale on line 2—2 of FIG. 5;

FIGS. 3, 4, 5 and 7 are transverse vertical sectional views on lines 3—3, 4—4, 5—5 and 7—7, respectively, of FIG. 2; and FIG. 6 is a fragmentary horizontal sectional view on line 6—6 of FIG. 2.

The tractor of the present invention is essentially one having front and rear 2-wheeled frame sections, with the axle live in each instance, articulating for relative swing motion about a vertical axis lying midway between the axles and occupying the longitudinal median line of both sections. The engine 10 for the tractor is carried by the front frame section 11, above and to the front of a differential 12 for the front axle 13, and is placed central to the width of the vehicle with its weight center somewhat to the front of said front axle. A transfer case 14 is also carried by the front frame section, being located in close proximity to the axis of articulation.

To produce this articulation, two vertically spaced coaxial pivot assemblies are provided, each comprising a king-pin 15 traversing a tongue 16 and the arms 17 of a fork in which the tongue is received. The fork-arms extend forwardly as a rigid centered prolongation of the rear frame section 18, and the tongues extend rearwardly as a rigid centered prolongation of the front frame section 11. The two pivot assemblies are rather widely spaced but with the lower assembly occupying a level no lower, by preference, than the level occupied by the two axles.

The transfer case has an upper-level input shaft pointing forwardly toward the engine, and lower-level output shafts one pointing forwardly and the other rearwardly. The upper of said two levels is spaced below the horizontal plane occupied by the engine's output shaft 20. The lower of said two levels is spaced above the horizontal plane occupied by input shafts for the vehicle's two differentials, namely the differential 12 and a differential 21 for the live rear axle 22. The two differentials are each desirably cocked in an upward direction with the angle of cock such that the points of intersection between lines projected axially from the differentials' two input shafts and the horizontal plane occupied by the output shafts of the transfer case is, in the instance of the front differential, immediately to the rear of the transfer case and, in the instance of the rear differential, spaced to the rear of the axis of articulation a distance generally approximating the distance to which the front point of intersection is spaced from said articulating axis. A torque shaft 23, fitted upon both ends with a respective universal 25, connects the forwardly pointing output shaft of the transfer case to the input shaft of the forward differential. A torque shaft 24, likewise fitted with universals 26 upon the two ends, extends to the input shaft of the rear differential from the after end of a drive line, hereinafter to be described, leading rearwardly from the rearwardly pointing output shaft of the transfer case. A short torque shaft 27 having universals 28 at the two ends carries the drive to the input shaft of the transfer case from the engine's output shaft 20. Each of the torque shafts 23, 24 and 27 is comprised of two telescoping sections connected by a spline but for the purpose of simplifying the illustration is shown in the drawings as a solid shaft.

Each of the two articulating frame sections comprises a main frame and a sub-frame. Designated by 30 and 31 in the instance of the front and the rear frame section, respectively, the two main frames each suggest a box girder and lie in a common plane on a level above the level occupied by the differentials. The main frame 30 is open at the rear and extends more or less equal distances fore and aft of the transverse vertical plane occupied by the axle and is sectionally of a rectangular configuration with considerable depth and a width which is or may be uniform throughout the length. The main frame 31 for the rear frame section extends rearwardly only to approximately the transverse vertical plane in which the rear axle lies and has the same cross-sectional configuration excepting that the flanking walls, for necessary clearance as the two sections swing relative to one another about the axis of articulation, taper inwardly at the front toward a narrow mouth 32.

In the area between the differentials and the axis of articulation, each main frame is prolonged downwardly to produce the sub-frames 33 and 34. Each sub-frame is open at the front and rear and has a moderately truncated triangular configuration in cross section. Sub-frame 33 guards the torque shaft 23 and produces a footing for the lower end of a braced frame-work 35 (see FIG. 7) in which the transfer case is rigidly hung. Sub-frame 34 guards the torque shaft 24 and gives rigid support to a box 36 in which a stub shaft 37 is journaled. This stub shaft is a part of the drive line hereinbefore referred to and has its two ends protruding from the box. The protruding rear end connects with the front universal of the torque shaft 24. The protruding front end connects by a universal 40 with the rear end of a short torque shaft comprised of telescoping sections 41 and 42 connected by a spline. The front end of such telescoping torque shaft connects by a universal 43 with a brake drum 44 which is fixed to the rearwardly pointing output shaft of the transfer case. The very short length of the torque shaft 41, 42, readily apparent from an inspection of FIG. 2 of the drawings, prescribes for such shaft an over-all transverse travel of approximately 3″, or which is to say 1½″ in either direction beyond center, as the tractor is swung between "hard-over" left and "hard-over" right turns. The telescoping motion is held to less than 1″ of travel.

Brake shoes (not shown) for the drum 44 as well as for drums associated with the four traction wheels 46 are operated in the usual manner from the driver's station which is shown in phantom in FIG. 1.

The rear differential 21, together with the housing for the live axle 22, is rigid with the rear frame section. The front differential 12 and the housing for the live axle 13 is rigidly carried by a cradle 50 which lies to the front of the sub-frame 33 and is mounted so as to rock relative to the front frame section about a horizontal axis occupying the longitudinal median line of such frame section. To produce this rocker mounting co-axial pivot connections are provided fore and aft of the differential. These pivot connections are each one in which a pivot pin traverses the arms of a furcate hanger and a tongue which is received between said arms. The pivot pins are designated by 51 and 52. The tongues, as 53 and 54, are rigid with the cradle. The hangers 55 and 56 are rigid with the main frame 30, being in each instance integral with a cross-member, as 57 and 58, of said frame. Cross-member 57 underlies the rear end of the engine and serves as a mounting therefor.

The means which are provided for the steering of the tractor are not here illustrated but suffice it to say that the rear frame section has a rigid arm extending forwardly therefrom in a position spaced to one side of the longitudinal median line, and the free end of this arm is pivoted to the outer end of a piston rod having its piston principal working in a hydraulic cylinder which is in turn pivotally rooted to the front frame section. Such steering arrangement is clearly shown in the patent hereinbefore identified. A hydraulic system for said cylinder and for brakes and other hydraulically operated structure with which the tractor is equipped includes the usual pump supplying fluid under pressure from a reservoir to suitable control valves. These valves and other controls for the operation of the tractor and a winch (not shown) powered from the engine by an auxiliary drive (also not shown) are or may be of the usual construction manipulated in the usual or a suitable manner.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. A vehicle comprising front and rear 2-wheeled sections, one a rocking section and the other a non-rocking section, articulating for swing motion one in relation to the other, about a vertical axis occupying the longitudinal median line of both sections, with each of said sections having a housed live axle for its two wheels, a cradle rigid with the housing for the live axle of the rocking section, a main frame for each of said sections, the frame for the non-rocking section being rigidly sustained by the related axle housing, the frame for the rocking section being carried by said cradle for rocker motion relative thereto about a horizontal axis occupying the longitudinal median line of the section, a respective differential for each of the axles each having an input shaft pointing inwardly toward the axis of articulation, an engine supported by one of the main frames providing an output shaft spaced longitudinally from and pointing inwardly toward the axis of articulation, a transfer mechanism supported by the same frame which supports the engine in said space between the output shaft and the axis of articulation and having both an upper level input shaft spaced from and pointing outwardly toward the engine's output shaft and two co-axial lower level output shafts one spaced from and pointing outwardly toward the input shaft of the related differential and the other spaced from and pointing inwardly toward the axis of articulation, the axis of the output shafts of the transfer mechanism occupying the longitudinal median line of the related section, a stub shaft journaled from the other main frame with its axis extending horizontally on the longitudinal median line of the frame on the same level as that occupied by the output shafts of the transfer mechanism and spaced from the axis of articulation a distance approximately the same as the transfer mechanism is spaced from said axis, a plurality of torque rods having a respective universal at the two ends of each and extending one as a drive connection from the output shaft of the engine to the input shaft of the transfer mechanism, one as a drive connection from the outwardly pointing output shaft of the transfer mechanism to the input shaft of the differential toward which it points, and one as a drive connection from the outwardly pointing end of the stub shaft to the input shaft of the differential toward which it points, and a telescoping torque rod comprising spline-connected sections having universals at the outer ends extending as a drive connection from the inwardly pointing output shaft of the transfer mechanism to the inwardly pointing end of the stub shaft.

2. A vehicle according to claim 1 in which the main frames occupy a common level above the level occupied by the axles, and wherein the lower end of the transfer mechanism, the stub shaft, and the two torque shafts which lead to the input shafts of the differential are housed by sub-frames which are rigid with and depend below the main frames.

3. The vehicle of claim 2 in which said sub-frames have a triangular configuration as viewed from the end to minimize liability of hanging up as the vehicle encounters stumps or other obstructions to free passage.

4. A vehicle according to claim 2 in which the front section is the rocking section and has the engine and the transfer mechanism carried thereby, the main frames including relatively deep channel principals extending along each of the two sides and in the instance of the rear section flaring inwardly at the front end to a narrow mouth.

5. A vehicle according to claim 1 in which the transfer mechanism is carried by the rocker-mounted main frame and is positioned thereon so that the axis of its output shafts approximately coincides with the rocker axis, the two axles occupying a common level below the level occupied by said coinciding axes and in each instance having the differential so placed that the axis of its input shaft approximately coincides with the axis of the torque rod which connects therewith.

6. A vehicle according to claim 1 having means for braking the output shafts of the transfer mechanism and including a drum fixed to the inwardly pointing output shaft in an intervening position between said inwardly pointing output shaft and the telescoping torque shaft.

7. A vehicle comprising front and rear 2-wheeled sections, the former a rocking section and the latter a non-rocking section, articulating for swing motion one in relation to the other, about a vertical axis occupying the longitudinal median line of both sections, with each of said sections having a housed live axle for its two wheels spaced in each instance a corresponding and substantial distance from the axis of articulation, a cradle rigid with the housing for the live axle of the rocking front section, a main frame for each of said sections, the frame for the non-rocking rear section being rigidly sustained by the related axle housing, the frame for the front rocking section being carried by said cradle for rocker motion relative thereto about a horizontal axis occupying the longitudinal median line of the section, a respective differential for each of the axles each having an input shaft pointing inwardly toward the axis of articulation, an engine supported by the frame of the front section providing an output shaft spaced longitudinally from and pointing inwardly toward the axis of articulation, a transfer mechanism also supported by the frame of the front section in close proximity to the axis of articulation and having both an upper level input shaft spaced from and pointing outwardly toward the engine's output shaft and two co-axial lower level output shafts one spaced from and pointing outwardly toward the input shaft of the related differential and the other pointing inwardly toward the axis of articulation, the axis of the output shafts of the transfer mechanism extending horizontally on the longitudinal median line of the related section, a stub shaft journaled from the other main frame with its axis occupying the longitudinal median line of the frame on approximately the same level as that occupied by the output shafts of the transfer mechanism and spaced from the axis of articulation a distance approximately the same as the transfer mechanism is spaced from said axis, a plurality of torque rods having a respective universal at the two ends of each and extending one as a drive connection from the output shaft of the engine to the input shaft of the transfer mechanism, one as a drive connection from the outwardly pointing output shaft of the transfer mechanism to the input shaft of the front section's differential, and one as a drive connection from the outwardly pointing end of the stub shaft to the input shaft of the rear section's differential, and a telescoping torque rod comprising spline-connected sections having universals at the outer ends extending as a drive connection from the inwardly pointing output shaft of the transfer mechanism to the inwardly pointing end of the stub shaft.

References Cited by the Examiner

UNITED STATES PATENTS

| | | | |
|---|---|---|---|
| 1,623,214 | 4/1927 | Storey | 180—50 |
| 2,827,715 | 3/1958 | Wagner. | |
| 2,835,397 | 5/1958 | Wagner. | |
| 3,007,590 | 11/1961 | Matthews et al. | 180—51 X |
| 3,167,147 | 1/1965 | Symons et al. | 180—51 |

A. HARRY LEVY, *Primary Examiner.*